United States Patent
Spector

(10) Patent No.: US 9,060,040 B2
(45) Date of Patent: Jun. 16, 2015

(54) THEMED ORNAMENT WITH STREAMING VIDEO DISPLAY

(71) Applicant: Donald Spector, New York, NY (US)

(72) Inventor: Donald Spector, New York, NY (US)

( * ) Notice: Subject to any disclaimer, the term of this patent is extended or adjusted under 35 U.S.C. 154(b) by 183 days.

(21) Appl. No.: 13/856,795

(22) Filed: Apr. 4, 2013

(65) Prior Publication Data

US 2013/0227435 A1 Aug. 29, 2013

Related U.S. Application Data

(63) Continuation-in-part of application No. 13/331,469, filed on Dec. 20, 2011, now Pat. No. 8,467,722, which is a continuation-in-part of application No. 12/180,901, filed on Jul. 28, 2008, now Pat. No. 8,099,039.

(60) Provisional application No. 60/954,879, filed on Aug. 9, 2007.

(51) Int. Cl.
*H04H 40/00* (2008.01)
*H04L 29/06* (2006.01)
*H04R 27/00* (2006.01)
*H04H 20/82* (2008.01)
*H04H 60/65* (2008.01)

(52) U.S. Cl.
CPC .............. *H04L 65/403* (2013.01); *H04H 20/82* (2013.01); *H04H 60/65* (2013.01); *H04R 27/00* (2013.01); *H04R 2227/003* (2013.01); *H04R 2420/07* (2013.01)

(58) Field of Classification Search
CPC . H04M 1/6066; H04M 1/7256; H04W 4/008; H04W 88/02
USPC .............. 455/3.06, 3.01, 39, 344, 347, 578.8, 455/41.2, 575.1
See application file for complete search history.

(56) References Cited

U.S. PATENT DOCUMENTS

| | | | |
|---|---|---|---|
| 7,003,515 B1 | 2/2006 | Glaser et al. | |
| 7,058,356 B2 * | 6/2006 | Slotznick | 455/3.05 |
| 7,065,342 B1 | 6/2006 | Rolf | |
| 7,817,591 B2 | 10/2010 | Cooley | |
| 7,873,040 B2 | 1/2011 | Karlsgodt | |
| 2004/0046783 A1 * | 3/2004 | Montebovi | 345/730 |
| 2004/0198175 A1 | 10/2004 | Shively et al. | |
| 2006/0168097 A1 | 7/2006 | Pittelli | |
| 2008/0194175 A1 | 8/2008 | Last et al. | |
| 2010/0042920 A1 | 2/2010 | Sigal | |

* cited by examiner

*Primary Examiner* — Sonny Trinh
(74) *Attorney, Agent, or Firm* — Collard & Roe, P.C.

(57) ABSTRACT

An apparatus for playing signals received from the Internet or other information highway on one or more speakers and video displays has a receiver for receiving information from a preselected address; a processor for interpreting the signals; a user interface for choosing between a connection to a personal computer and the preselected address; and at least one sound emitting device and a display for playing the processed signal. The apparatus has an ornamental design on the outside which is related to the topic of the signals received from the address.

4 Claims, 2 Drawing Sheets

THEMED ORNAMENT WITH STREAMING VIDEO DISPLAY

CROSS REFERENCE TO RELATED APPLICATIONS

This application is a continuation-in-part under 35 U.S.C. §120 of U.S. patent application Ser. No. 13/331,469 filed on Dec. 20, 2011, which is a continuation-in-part of U.S. patent application Ser. No. 12/180,901 filed Jul. 28, 2008, now U.S. Pat. No. 8,099,039 issued Jan. 17, 2012, which claims the benefit of priority under 35 U.S.C. §119(e) to U.S. Provisional Patent Application Ser. No. 60/954,879, filed Aug. 9, 2007, the entirety of all of which is hereby incorporated by reference.

BACKGROUND OF THE INVENTION

This application relates to the field of internet receivers that are capable of receiving Internet radio and video signals. More specifically, this application relates to themed ornamental objects that relate to a specific station that is received through these devices by Wi-Fi, Wi-Max or other wireless data transmission. The device can also be wirelessly connected to a computer with a digital library stored thereon, and selections from the library can be played by the device as well.

Streaming video broadcasts are a popular way for individuals to view movies, television shows, music videos, informational segments and educational programs. The programs can be ordered and instantly streamed to the playing device, which can be a home computer, tablet, mobile telephone or television. The videos are streamed via a Wi-Fi or other connection to the Internet and displayed on a display screen for the viewer to view.

It would be desirable to create a teaching device utilizing streaming video in conjunction with an ornamental device that is related to the subject being streamed, to enhance the learning experience.

SUMMARY OF THE INVENTION

The present invention relates to an Internet Radio and Video receiver having an ornamental design that is related to a topic. The ornamental design may be of any number of topics, and could be related to educational services. By way of example, the ornamental design may be an anatomical mannequin. In accordance with one or more embodiments, these receivers are capable of picking up multiple Internet Radio stations and video feeds. In a preferred embodiment, the Internet Station can be programmed based on the user's preferences, so that only selections that coincide with the user's preferences are played. This can be accomplished according to the method described in U.S. Pat. No. 7,003,515, the disclosure of which is herein incorporated by reference.

When the device is turned on, it may be programmed to automatically broadcast events related to the product it represents. For example, the ornament can be a mannequin having a screen connected to a video player in place of its internal organs, and the video feed can be related to an anatomy class.

The device is preferably a microprocessor connected to a modem for receiving Internet service, as well as a display screen for displaying the streaming video. Preferably, the device is a tablet computer attached to the ornament and programmed to play only videos that are related to the subject of the ornament. Additional speakers could also be connected to the device for playing the sounds from the streaming video in an enhanced manner.

In addition, the apparatus is also configured to connect to a personal computer. The computer can store additional content that is also related to the theme of the ornament. The device can have a means for overriding the streaming radio and switching to selected content from the computer as well. The computer has software that allows the user to create a play list of the selected content, which can then be played by the device.

The receiver can be wirelessly connected on its own to the internet or other information highway. Other aspects have suitable apparatus such as a router to connect the receiver to the Internet or other information highway using Wi-Fi or Wi-Max technology. Any connection to the internet, however, can be used. Alternatively, the receiver can be connected to a smartphone with video streaming capability, either through Wi-Fi or cellular service such as 4G. The video stream from the smartphone is sent directly to the receiver and broadcast through the video screen on the receiver.

The device has a processor that connects to one of a plurality of preselected addresses on the internet or other information highway. The apparatus also has an interface for selecting the one of the plurality of preselected addresses, as well as an interface for selecting whether the playlist from the computer should be used instead. The interface could be a push button or a dial with a video display of the programs offered, or a touch screen on the display itself.

DETAILED DESCRIPTION

As used in this specification and the appended claims, "internet" refers not only to the internet, but also to any wide area network or local area network. Use of the term "internet" is not intended to limit the present invention to communications received via the world wide web.

As used in this specification and the appended claims, "pre-selected" means that the internet address, or URL, has been programmed into the device. The pre-selected address may be a default address, or a selection of addresses to which the user can set the device to default.

The invention relates to apparatuses for playing signals received from the internet or other information highway on one or more speakers and video displays. The apparatus comprises a receiver that connects to the internet or other information highway. A processor is included in the receiver that connects to a preselected address on the internet or other information highway. A connection to which the one or more speakers can be connected to play signals received from the preselected address on the internet or other information highway. The outside of the receiver has an ornamental design related to the topic of the signals received from the preselected address on the internet or other information highway.

The invention can be wirelessly connected to the internet or other information highway or can use a cable connecting the receiver directly to a modem.

Detailed embodiments of the invention have a processor that connects to one of a plurality of preselected addresses on the internet or other information highway. The apparatus also has an interface for selecting the one of the plurality of preselected addresses. Another aspect has a plurality of ornamental designs on the apparatus. Each of the ornamental designs may be related to a topic on each of the plurality of preselected addresses.

The ornamental design may be related to an educational subject such an a mannequin for anatomical research. Any suitable shape and design could be used. For example, the ornament could be related to engineering, biology, astronomy, or any subject of interest. The microprocessor has preselected internet content, either streaming or pre-recorded, for playback on the device.

Figure 1:
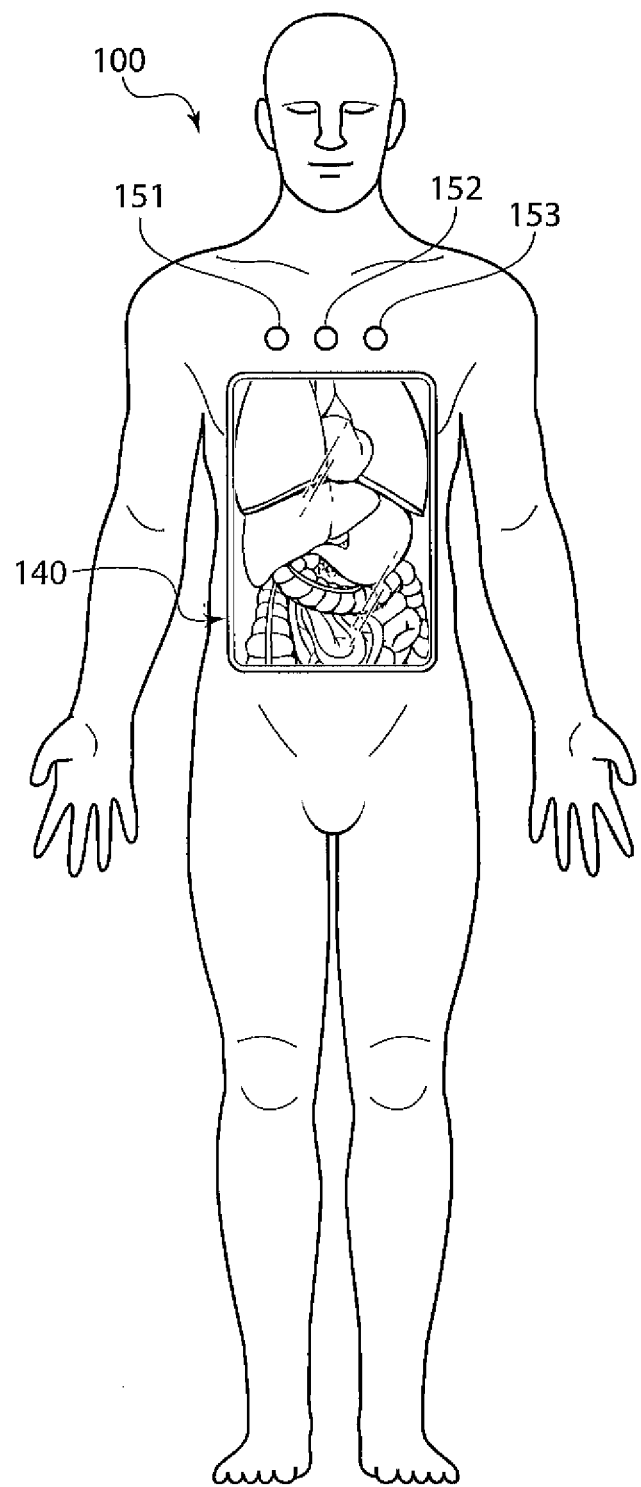
FIG. 1 shows an one embodiment of the Internet Video system in accordance with the invention.
Figure 2:
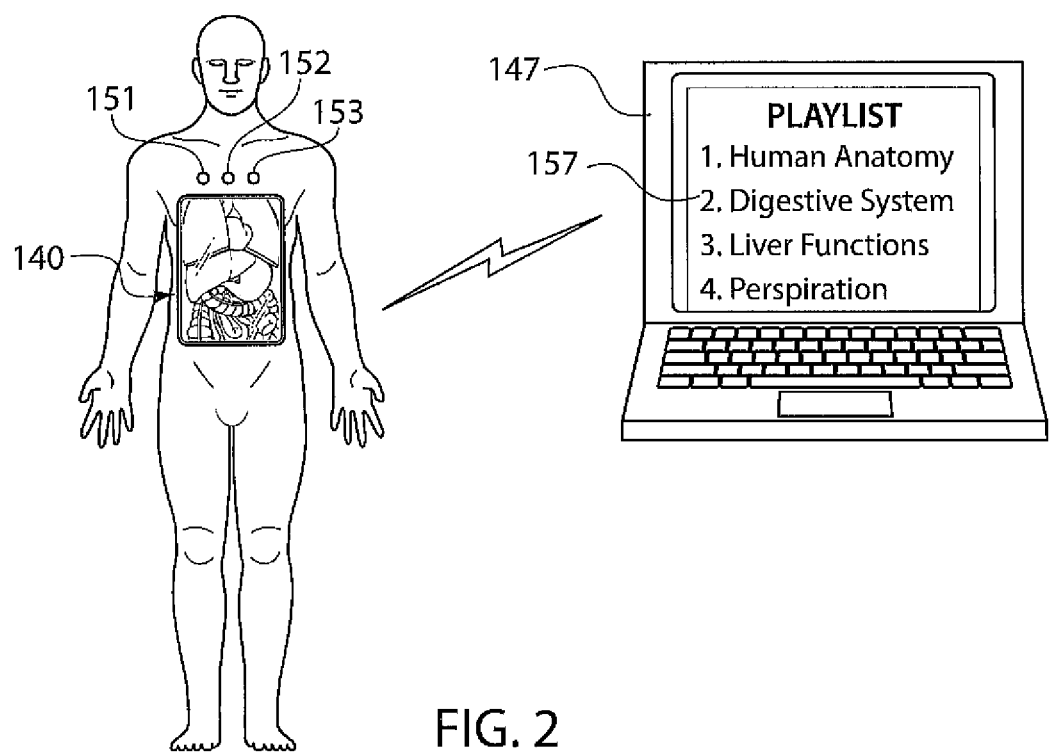
FIG. 2 shows the internet video system in communication with a personal computer.
Figure 3:
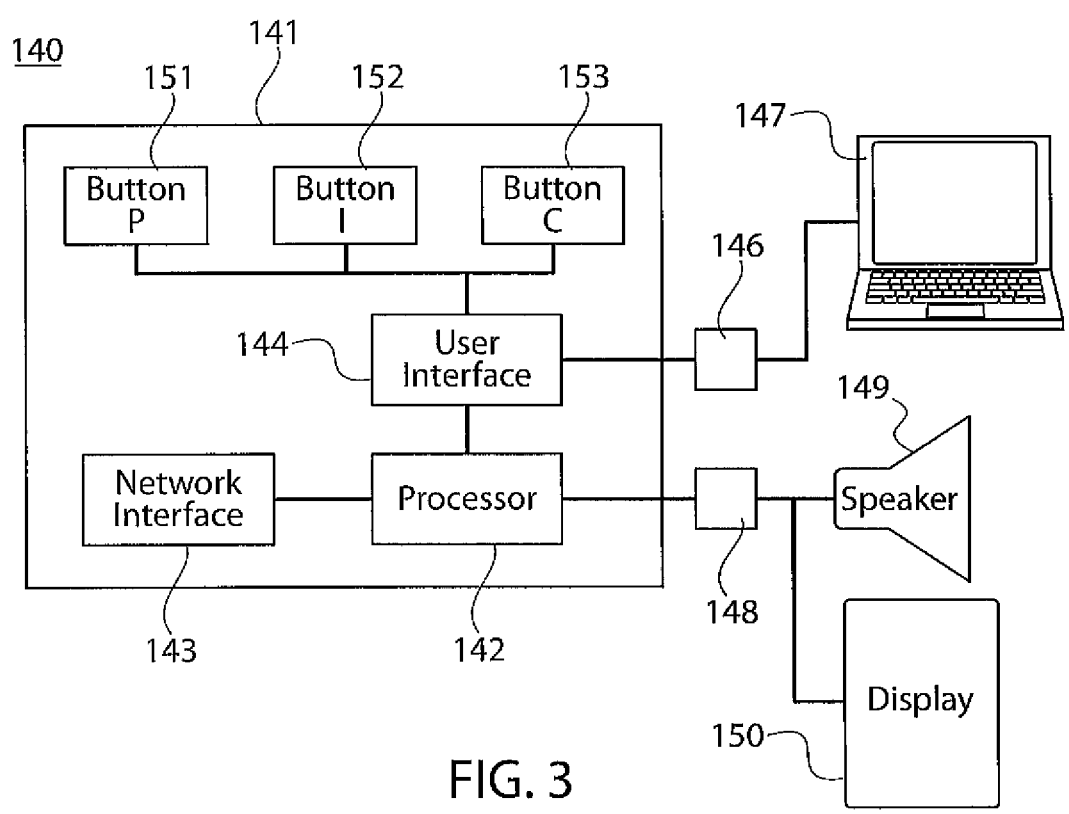
FIG. 3 shows a block diagram of the components of the internet video system of FIGS. 1 and 2.

FIGS. 1-3 show one embodiment of the invention. Here, the device takes the form of a mannequin 100. There is a receiver 140 built into the body cavity of mannequin 100. Controls 151, 152 and 153 are located on mannequin 100 to control the power and selection of programming of receiver 140.

FIG. 2 shows the mannequin 100 connected to a personal computer 147. Signals from personal computer 147 are conveyed wirelessly to receiver 140 for playback on receiver 140.

Device 140 is shown schematically in FIG. 3. Receiver 140 comprises a processor 142 contained within the housing 141 coupled to a network interface 143. The network interface 143 can be a wireless connection or a wired connection. Receiver 140 may include a user interface 144 which interacts with the processor 142 to provide accessible controls for a user. The user interface 144 has a series of controls 151, 152, 153 to control the content being played. Control 151 allows the user to control the power to the device, and control 152 allows the user to select the content being broadcast through mannequin 100 via the internet.

User interface 144 could incorporate a connection 146 which would allow the receiver 140 to be attached to a personal computer 147. By way of example, the housing 141 may be connected to the personal computer 147 by a USB or wireless connection. Software running on the personal computer 147 allows the user to create a playlist 157, as shown in FIG. 2, which organizes the video content stored on computer 147, and have playlist 157 be played on radio 140. Selecting control 153 on mannequin 100 allows the user to switch from the internet streaming video signals being played to the selected playlist 157 from the content stored on the computer 147. Selecting button 152 again then switches the broadcast back to the internet radio. Receiver 140 is preprogrammed to default to an internet address or radio station that coincides with the theme of the ornament, which in this case is an anatomical mannequin. For example the internet content could be an anatomy lesson for medical students.

The housing 141 has an audio/video connector 148 attached to the processor 142. This audio/video connector 148 can be any type of interface which would enable an audio and video signal to be transmitted from the processor 142 to a speaker 149 and display screen 150. For example, standard cable wire could be employed. Additionally, the audio interface 148 may be a wireless interface (i.e., infrared transmission) which can be received by a suitable apparatus in the speaker 149 and display screen 150. The speaker 149 and display screen 150 are located within housing 141, but could also be located remotely. Where the speaker 149 is located remotely from the housing 141, the speaker may also have an ornamental design. The speaker may also have controls to provide power and volume control (not shown).

It is to be understood that the invention is not limited to the details of construction or process steps set forth in the following description. The invention is capable of other embodiments and of being practiced or being carried out in various ways.

What is claimed is:

1. An apparatus for playing signals received from the internet or other information highway, comprising;
    a receiver that connects to the internet or other information highway;
    a processor in the receiver for selecting the content received by the receiver;
    at least one speaker and at least one and video display;
    a connection to which the at least one speaker and video display are connected to play the selected content received from the internet or other information highway via the receiver;
    a connection from the receiver to a personal computer;
    a user interface that allows the user to switch the speakers and display from playing signals received from the internet or other information highway to signals from the personal computer; and
    an ornamental design on the apparatus that is related to the content received from the address on the internet or other information highway, wherein the ornamental design is a mannequin and the processor is configured to select content that relates to biology or anatomy.

2. The apparatus of claim 1, wherein the receiver wirelessly connects to the internet or other information highway.

3. The apparatus of claim 2, wherein the receiver wirelessly connects to the internet or other information highway via one of a Wi-Fi connection, Wi-Max connection or a microwave connection.

4. The apparatus of claim 1, wherein the one or more speakers are connected to the connection and are physically connected to the apparatus.

* * * * *